United States Patent [19]

Floreancig et al.

[11] Patent Number: 4,744,960
[45] Date of Patent: May 17, 1988

[54] PROCESS FOR THE SEPARATION OF RARE EARTHS AND URANIUM OF A $UF_4$ CONCENTRATE AND FOR PUTTING THEM INTO USEFUL FORM

[75] Inventors: Antoine Floreancig, Saint Genis Laval; Bernard Martinez, Narbonne, both of France

[73] Assignee: Uranium Pechiney, Courbevoie, France

[21] Appl. No.: 878,212

[22] Filed: Jun. 25, 1986

[30] Foreign Application Priority Data

Jun. 27, 1985 [FR] France ................................ 85 10374

[51] Int. Cl.$^4$ ............................................. C01G 43/00
[52] U.S. Cl. .......................................... 423/10; 423/8; 423/15; 423/18; 423/21.1; 423/21.5
[58] Field of Search ..................... 423/10, 15, 18, 21.1, 423/21.5, 8

[56] References Cited

U.S. PATENT DOCUMENTS

| | | | |
|---|---|---|---|
| 2,815,264 | 12/1957 | Calkins et al. | 423/21.1 |
| 3,659,128 | 11/1975 | Angstadt | 423/21.1 |
| 3,937,783 | 2/1976 | Wamser et al. | 423/18 |
| 4,461,748 | 7/1984 | Sabot et al. | 423/10 |

OTHER PUBLICATIONS

Bailar et al., *Comprehensive Inorganic Chemistry*, vol. 4, pp. 50–53, Pergamon Press (1973), Oxford.

*Primary Examiner*—Edward A. Miller
*Attorney, Agent, or Firm*—Dennison, Meserole, Pollack & Scheiner

[57] ABSTRACT

The present invention relates to a proces for separating rare earths and uranium from a $UF_4$ concentrate and for placing them into useful form, comprising attacking the $UF_4$ concentrate with potassium hydroxide, followed by nitric acid dissolution of the resulting precipitate, and extraction of the solution using an organic solvent. The extraction results in an organic solution containing purified uranyl nitrate, and an aqueous solution from which rare earths are precipitated by means of a base.

6 Claims, 1 Drawing Sheet

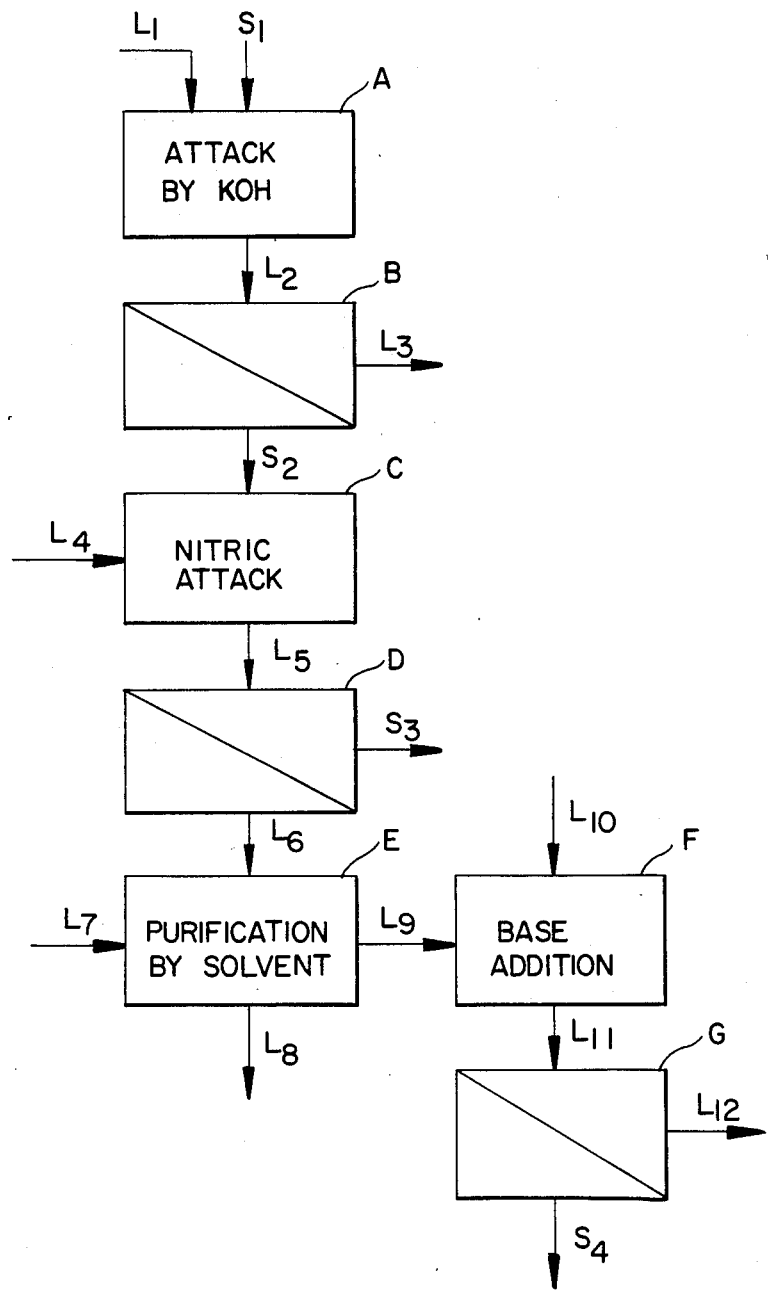

PROCESS FOR THE SEPARATION OF RARE EARTHS AND URANIUM OF A UF$_4$ CONCENTRATE AND FOR PUTTING THEM INTO USEFUL FORM

The present invention relates to a process for the separation of rare earths of a UF$_4$ concentrate and putting them into a useful form.

The man skilled in the art is aware that it is possible to recover uranium from phosphoric acid produced by the sulphuric attack on natural phosphates.

The recovery operation consists of treating the acid with a water-immiscible organic solvent which has a high level of affinity for uranium such as for example octylpyrophosphoric acid and then bringing said solvent into contact with hydrofluoric acid to precipitate uranium tetrafluoride UF$_4$ which will be subsequently converted into UF$_6$ or uranium metal.

However, the phosphoric acid contains impurities, in particular rare earths, and also thorium and yttrium which is similar to a rare earth, and those elements generally accompany the uranium when it is treated by the solvent so that they reappear in the UF$_4$. Now, the requirements made by the nuclear industry in regard to state of purity are such that it is found to be essential to effect separation of those rare earths.

It is true to say that the problem of purifying UF$_4$ is not a new one and some solutions thereto have already been found. Thus for example French Pat. No. 2,429,746 teaches a process in which UF$_4$ is dissolved in an acid in the presence of a complexing agent such as aluminum sulphate to give an aqueous solution of uranium, which, after filtration, is treated with hydrogen peroxide to give a hydrated, purified uranium peroxide.

However, the purification effect desired seeks to comply with the demands of certain American refiners of "yellow cake", namely less than 0.15% of fluoride, 1% of iron, 1% of calcium, and 0.5% of magnesium by weight and with respect to the uranium content.

There is therefore in no way any question of purification in respect of rare earths and moreover in such a process, those elements, except thorium, are all to be found again in part in the peroxide, the other part going in diluted form into the solution of aluminum fluoride and consequently being difficult to put into useful form.

On the other hand, the dissolution of UF$_4$ in an acid which in most cases is nitric acid results in the formation of fluonitric solutions which are highly corrosive and give rise to the danger of seriously damaging the installations in which they are carried, unless particular precautions are taken.

However, having regard to the interest presented by some rare earths, a procedure which permits them to be separated from uranium in a form in which they can be directly put to use would undoubtedly be a highly attractive proposition in regard to economy of the process.

It is for that reason that the applicants sought and found a process whose aim is to separate rare earths from the uranium which are contained in UF$_4$ and which makes it possible:

to remove fluorides, as from the first stage, and thus reduce the problems of corrosion, to recover the rare earths and yttrium in a usable form, and to obtain a solution of uranium whose purity is sufficient to provide products which comply with the requirements of refiners, in particular from the point of view of the fluorides content.

The process is characterised in that it comprises the following steps:

attacking the UF$_4$ with potassium hydroxide and separating the solid uranium and rare earths hydroxides from the resulting suspension, dissolving the hydroxides with nitric acid and separating the insoluble matter formed by thorium hydroxide and a part of the rare earths which are thus put into useful form, purifying the solution of nitrates by means of an organic solvent so as to extract therefrom uranyl nitrate and to leave the rare earths in the aqueous phase, and adding a base to the aqueous phase to percipitate the balance of the rare earths in the form of usable hydroxides.

The invention therefore consists firstly of attacking impure UF$_4$ with potassium hydroxide so as to produce the following reaction:

$$UF_4 + 4KOH \rightarrow 4KF + U(OH)_4$$

The potassium hydroxide used is in the form of a 50% by weight lye such as is commercially available or is produced by dissolving pellets.

The amount of potassium hydroxide used is between 1 and 3 times the stoichiometric amount corresponding to the formation of U(OH)$_4$, that is to say about 0.95 to 2.85 kg of KOH/kg, and depends on the amount of rare earths and thorium in the UF$_4$ used.

The reaction is preferably carried out at from 70° to 110° C. with agitation and for a sufficient period of time to ensure complete decomposition of the UF$_4$. That result is generally attained in less than 4 hours.

The suspension resulting from that reaction is then filtered to give a solution of potassium fluoride which is virtually free from uranium and a precipitate of hydroxide of U(OH)$_4$, containing rare earths which are washed over a filter with a substantial amount of water.

The precipitate is then dissolved by a technical nitric acid solution, preferably a 53% by weight solution, so as to have a degree of free acidity of higher than 0.05N without thereby reaching excessively high values which would give rise to an excessive consumption of acid. Operation is carried out at from 40° to 100° C. and preferably from 70° to 90° C. for a period of 1 to 2 hours. Under those conditions, the uranium is totally solubilized in accordance with the following reaction:

$$3U(OH)_4 + 8HNO_3 \rightarrow 3UO_2(NO_3)_2 + 2NO + 10H_2O$$

while the thorium remains virtually unattacked. As regards the rare earths, solubilization thereof is partial and decreases from cerium to ytterbium and to ytrium.

It is therefore possible at that stage to recover a part of the rare earths by separation of the insoluble matter by means for example of a filtration operation.

The solution containing the uranyl nitrate and the balance of the rare earths is then purified by liquid-liquid extraction by means of an organic solvent such as for example tributylphosphate so as to recover on the one hand a purified organic solution of uranyl nitrate and on the other hand an aqueous solution containing the rare earths.

It is only necessary to add a base such as ammonia, sodium hydroxide, potassium hydroxide or lime for example to said aqeuous solution and in a sufficient amount to precipitate the rare earths in the form of hydroxides which can be put together with the insoluble matter from the nitric dissolution operation.

As regards the uranyl nitrate solution, it may resume the normal circuit of the uranium cycle to be converted for example into pure $UF_4$ before resulting in $UF_6$ or uranium of nuclear quality.

The invention will be better appreciated by reference to FIG. 1 showing the different steps in the process according to the invention.

Shown therein is a reactor A in which the operation of attacking impure uranium fluoride $S_1$ by means of a potassium hydroxide lye $L_1$ is carried out. The resulting suspension $L_2$ is separated in a filter B into a solution of potassium fluoride $L_3$ and a precipitate $S_2$ of uranium hydroxide, accompanied by rare earths. That precipitate is dissolved in a reactor C using a solution of nitric acid $L_4$ to form a suspension $L_5$ whose phases are separated in a filter D to give a precipitate $S_3$ containing virtually all the thorium and a portion of rare earths and a solution $L_6$ of uranyl nitrate containing the balance of the rare earths. That solution is purified by liquid-liquid extraction using the solvent $L_7$ in a battery E of extraction and re-extraction mixing-settling units from which there issues a solution of uranyl nitrate $L_8$ which is a suitable state of purity to be re-injected into the uranium cycle and an aqueous solution $L_9$ from which the hydroxides of rare earths are precipitated in the reactor F by means of a base $L_{10}$; the rare earth hydroxides are separated by means of the filter G from the suspension $L_{11}$ to give an aqueous solution $L_{12}$ which is dumped and a concentrate $S_4$ which can be used directly for the production of rare earths.

The invention may be illustrated by means of the following examples of use thereof, which employed a $UF_4$ with high proportions of thorium and rare earths, resulting from the recovery of uranium from a phosphoric acid by means of a solvent, being of the following composition in percent by weight: U:44.5—Y:4.5—Th:5.8—Yb:1.1—Ce:0.95—Fe:0.1—Na:5.6—F:30—various:7.45.

EXAMPLE 1

This $UF_4$ was subjected to the process according to the invention with variable amounts of reactants KOH and $NO_3H$ and under different conditions in respect of temperature and period of time.

In dependence on those parameters, the yields in respect of solubilization of $UF_4$ and rare earths in potassium hydroxide and in nitric acid were determined. The results are set out in following Table I:

| | | | 1 | 2 | 3 | 4 |
|---|---|---|---|---|---|---|
| Tests No | | | | | | |
| Treat. KOH | KOH kg/kg | U | 3.0 | 2.19 | 1.216 | 2.19 |
| | Temp. | °C. | 105 | 90 | 90 | 70 |
| | Time | h | 4 | 2 | 4 | 4 |
| | Solubilization yield % | F | 83 | 81 | 70 | 76 |
| | | U | 0 | 0 | 0 | 0 |
| | | Y,Th | 0 | 0 | 0 | 0 |
| | | Ce,Yb | | | | |

| | | | 1A | 1B | 2A | 2B | 3A | 3B | 4A | 4B |
|---|---|---|---|---|---|---|---|---|---|---|
| Tests | | | | | | | | | | |
| Treat. $HNO_3$ | $HNO_3$/kg | U | 3.0 | 1.15 | 3.0 | 1.05 | 1.05 | 1.05 | 1.8 | 1.15 |
| | Temp. | °C. | 90 | 0 | 90 | 90 | 90 | 40 | 90 | 90 |
| | Time | h | | | | | | | | |
| | Solubilization yield % | U | 100 | 100 | 99.9 | 99.95 | 99.4 | 99.5 | 99.95 | 99.95 |
| | | F* | 92.5 | 91.1 | 88.3 | 86.2 | 76.7 | 77.9 | 84.8 | 83.5 |
| | | Ce | 99.5 | 98.5 | 97.1 | 95.5 | 83.4 | 85.6 | 97.1 | 96.6 |
| | | Th | 6.0 | 5.5 | 5.5 | 3.9 | 2.4 | 4.5 | 5.4 | 4.8 |
| | | Yb | 94.5 | 90.0 | 89.7 | 73.0 | 26.5 | 29.0 | 83.6 | 80.1 |
| | | Y | 90.5 | 85.0 | 74.9 | 44.7 | 9.2 | 13.0 | 64.6 | 54.4 |
| | Solution $UO_2(NO_3)_2$ | U g/l | 230 | 244 | 234 | 265 | 247 | 262 | 273 | 255 |
| | | H+ g/l | 5.8 | 0.25 | 5.9 | 0.05 | 0.10 | 0.08 | 1.9 | 0.3 |

*Total F solubilized by the double treatment

These various tests show that the initial treatment of impure $UF_4$ by means of potassium hydroxide makes it possible for the uranium to be put into a form in which it can be easily solubilized by nitric acid while making it possible to eliminate the major part of the fluorine content.

Depending on the operating conditions, it is possible if desired to put into useful form the other elements contained in the substance, including cerium and ytterbium which can be used as a rare earth tracer, to increase solubilization of the other elements. In any case, thorium is solubilized to a very slight degree and can be removed.

EXAMPLE 2

22.5 kg of impure $UF_4$, namely 10 kg of uranium, was treated at 90° C. for 4 hours using 28.2 kg of a 50% potassium hydroxide solution in the reactor A.

After filtration and washing, that gave on the one hand a solution $L_3$ of potassium fluoride, which is free from uranium, cerium, thorium, ytterbium and yttrium containing 5.35 kg of fluorine out of the 6.75 kg contained in the initial $UF_4$, and, on the other hand, a green-black precipitate $S_2$ of uranium hydroxide containing all the initial uranium and all the elements which are insoluble in a basic medium such as Ce, Th, Yb and Y. That precipitate was treated in C using 18.9 kg of technical 53% $HNO_3$ for a period of 2 hours at 90° C. After filtration and washing, the result is an impure uranyl nitrate solution $L_6$ containing 248 g/l of uranium and 6.1 g/l only of fluorine ions and 10.35 kg of a wet insoluble material $S_3$ containing only 25 g of uranium.

The solution $L_6$ of uranyl nitrate in impure form was treated in counter-flow relationship in E with a solution of tributylphosphate in dodecane in order to extract the uranium therefrom, then the uranium was re-extracted from that organic solution by means of water to give a pure aqueous solution of uranyl nitrate.

The extraction raffinate $L_9$ was neutralized using sodium hydroxide and after filtration and drying the result was a concentrate S4 with a high proportion of thorium and rare earths.

Table 2 below sets out the distribution of the different elements uranium, fluorine and rare earths, in the course of the various steps in the process.

was treated with ammonia to precipitate the elements contained therein, Y, Ce and rare earths, in a usable form.

The material balance sheet which is set forth in Table 3 shows the distribution in respect of U, Y, Th, Ce and Yb at the different steps in the process.

| Drawing ref. | S1 | L3 | S2 | S3 | L6 | L8 | S4 |
|---|---|---|---|---|---|---|---|
| Product | Impure $UF_4$ | KF solution | Insoluble KOH | Insoluble $HNO_3$ | Impure solution $UO_2(NO_3)_2$ | Pure solution $UO_2(NO_3)_2$ | NaOH prec. |
| Weight | | | | | | | |
| dry kg | 22.5 | | 20.50 | 3.83 | | | 1,65 |
| wet kg | | | 27.30 | 10.35 | | | |
| Elem. | | | | | | | |
| U kg | 10.000 | <0.001 | 10.000 | 0.025 | 9.975 | 9.970 | 0,05 |
| F kg | 6.750 | 5.350 | 1.400 | 1.050 | 0.350 | | |
| Ce kg | 0.217 | 0.001 | 0.216 | 0.010 | 0.206 | <0.001 | 0,205 |
| Th kg | 1.310 | <0.001 | 1.310 | 1.240 | 0.070 | <0.001 | 0,070 |
| Yb kg | 0.250 | <0.001 | 0.250 | 0.046 | 0.204 | <0.001 | 0,204 |
| Y kg | 1.010 | <0.001 | 1.010 | 0.530 | 0.480 | <0.001 | 0,480 |

This Example shows that the uranium is recovered in the form of a very pure solution of uranyl nitrate whereas the major part of the thorium is removed in the form of matter which is insoluble in the medium $HNO_3$. The other elements such as Ce, Y and rare earths can be made usable in the form of a concentrate which has a high content of such elements either at the stage of the insoluble matter from the nitric dissolution step, or after the addition of sodium hydroxide.

EXAMPLE 3

This Example uses the same initial $UF_4$, but with larger amounts of KOH and $HNO_3$ than in the preceding Example.

22.5 kg of impure $UF_4$ was treated at 90° C. for 2 hours using 55 kg of a 50% potassium hydroxide solution in the reactor A. After filtration and washing, the result obtained was 26.7 kg of a green-black precipitate S2 of uranium hydroxide containing all the initial uranium as well as all the elements insoluble in a basic medium of the starting $UF_4$, such as Ce, Th, Yb, Y, Fe . . . .

That precipitate was then treated in C using 59 kg of 53% $HNO_3$. After filtration and washing, the result obtained was an impure solution of uranyl nitrate containing 232 g/l of uranium, which was treated in E in counter-flow relationship using a 30% solution of tributylphosphate in technical dodecane. After re-extraction with water of the charged solvent, the result obtained was a pure solution of uranyl nitrate and an extraction raffinate containing the other elements. The raffinate

| Drawing ref. | S1 | L3 | S2 | S3 | L6 | L8 | S4 |
|---|---|---|---|---|---|---|---|
| Product | Impure $UF_4$ | KF solution | Insoluble KOH | Insoluble $HNO_3$ | Impure solution $UO_2(NO_3)_2$ | Pure solution $UO_2(NO_3)_2$ | $NH_4OH$ prec. |
| Weight | | | | | | | |
| dry kg | | | | 2.020 | | | 2.060 |
| wet kg | | | 26.700 | 6.540 | | | |
| Elements | | | | | | | |
| U kg | 10.000 | <0.001 | 10.000 | 0.004 | 9.996 | 9.995 | 0.01 |
| F kg | 6.750 | 5.85 | 0.900 | 0.510 | 0.490 | <0.003 | — |
| Ce kg | 0.217 | 0.001 | 0.216 | 0.002 | 0.214 | <0.001 | 0.214 |
| Th kg | 1.310 | <0.001 | 1.316 | 1.235 | 0.075 | <0.001 | 0.075 |
| Yb kg | 0.250 | <0.001 | 0.250 | 0.020 | 0.230 | <0.001 | 0.230 |
| Y kg | 1.010 | <0.001 | 1.010 | 0.120 | 0.890 | <0.001 | 0.890 |

This Table shows that the uranium contained in the impure $UF_4$ is made usable in the form of a very pure solution of uranyl nitrate. The use of more substantial amounts of reactants KOH and $HNO_3$ makes it possible to increase the proportion of usable Y, Yb and Ce, the major part of the thorium being removed in the insoluble matter obtained after the step of dissolution using nitric acid.

What is claimed is:

1. A process for separation of rare earth and uranium compounds from a $UF_4$ concentrate produced generally by acid attack on a uranium-containing phosphate ore, followed by solvent extraction of uranium and rare earth compounds, and treatment of the solvent-containing uranium and rare earth compounds with hydrofluoric acid, and for placing the compounds into usable form, comprising the steps of:
    (a) attacking the $UF_4$ concentrate with potassium hydroxide and separating the resultant solid hydroxides of uranium and rare earths from the resulting suspension;
    (b) dissolving said solid hydroxides in aqueous nitric acid to form an aqueous solution of nitrates and separating the resultant insoluble matter formed by thorium and a part of the rare earths which are thus put into usable form;
    (c) extracting uranyl nitrate from the solution of nitrates with an organic solvent, with rare earth nitrates remaining in the aqueous phase; and (d) adding a base to the aqueous phase to precipitate the balance of the rare earths in the form of usable hydroxides.

2. A process according to claim 1, wherein the step of attacking the UF$_4$ concentrate is carried out with an amount of potassium hydroxide which is between 1 and 3 times the stoichiometric amount corresponding to the formation of U(OH)$_4$.

3. A process according to claim 1, wherein the step of attacking the UF$_4$ concentrate with potassium hydroxide is carried out at between 70° and 110° C.

4. A process according to claim 1, wherein the step of dissolving in nitric acid is carried out maintaining the level of free acidity higher than 0.05N.

5. A process according to claim 1, wherein said organic solvent is tributylphosphate.

6. A process according to claim 1, wherein said base is ammonia, sodium hydroxide, potassium hydroxide or lime.

* * * * *